United States Patent
Kaku

(10) Patent No.: US 10,178,458 B2
(45) Date of Patent: Jan. 8, 2019

(54) VOICE RECOGNITION DEVICE

(71) Applicant: TOYOTA JIDOSHA KABUSHIKI KAISHA, Toyota-shi (JP)

(72) Inventor: Wataru Kaku, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/671,715

(22) Filed: Aug. 8, 2017

(65) Prior Publication Data
US 2018/0098142 A1   Apr. 5, 2018

(30) Foreign Application Priority Data

Oct. 4, 2016   (JP) .................................. 2016-196673

(51) Int. Cl.
*H04R 1/02* (2006.01)
*H04R 1/08* (2006.01)
(Continued)

(52) U.S. Cl.
CPC .................. *H04R 1/08* (2013.01); *A63H 3/02* (2013.01); *A63H 3/36* (2013.01); *A63H 33/26* (2013.01); *B25J 9/0006* (2013.01); *B25J 19/026* (2013.01); *H04R 1/023* (2013.01); *H04R 1/025* (2013.01); *H04R 1/028* (2013.01); *H04R 1/086* (2013.01); *H04R 19/04* (2013.01); *A63H 2200/00* (2013.01); *G10L 15/28* (2013.01); *H04R 2410/07* (2013.01)

(58) Field of Classification Search
CPC .......... H04R 1/08; H04R 1/086; H04R 1/023; H04R 1/025; H04R 19/04; H04R 2201/003; H04R 2410/07; B81B 2201/0257; G10L 15/28; A63H 33/26
USPC ....... 381/355, 356, 357, 358, 359, 360, 361, 381/368, 369, 173, 174, 175; 704/226, 704/231, 235
See application file for complete search history.

(56) References Cited

U.S. PATENT DOCUMENTS

| 2011/0170726 A1* | 7/2011 | Takano | ..................... H04R 1/38 381/355 |
| 2013/0051586 A1* | 2/2013 | Stephanou | ............... H04R 1/04 381/173 |

(Continued)

FOREIGN PATENT DOCUMENTS

JP   2003-311028   11/2003

*Primary Examiner* — Huyen D Le
(74) *Attorney, Agent, or Firm* — Oblon, McClelland, Maier & Neustadt, L.L.P.

(57) ABSTRACT

A technique capable of accurately recognizing a voice input from a user and to uniform likelihood of depression of an outer skin is provided. A voice recognition device P includes an exoskeleton 5, a cushion member 6 that has elasticity and covers the exoskeleton 5, an outer skin 7 that covers the cushion member 6, a microphone 3 fixed to the exoskeleton 5, and a voice recognition unit 4 that recognizes a voice obtained by the microphone 3. In a voice input area 11, which is on an outer side of the microphone 3, the cushion member 6 has zero thickness. In a position in the vicinity of the microphone 3 that does not overlap the microphone 3, spring members 13 that are extended from the exoskeleton 5 to the outer skin 7 and are less compressed and deformed than the cushion member 6 are arranged.

3 Claims, 9 Drawing Sheets

(51) Int. Cl.
*H04R 19/04* (2006.01)
*A63H 3/02* (2006.01)
*A63H 3/36* (2006.01)
*A63H 33/26* (2006.01)
*B25J 9/00* (2006.01)
*B25J 19/02* (2006.01)
*G10L 15/28* (2013.01)

(56) References Cited

U.S. PATENT DOCUMENTS

2017/0245036 A1* 8/2017 Kuki .......................... C08J 7/00
2018/0242065 A1* 8/2018 Doi .......................... B60R 11/02

* cited by examiner

VOICE RECOGNITION DEVICE

CROSS REFERENCE TO RELATED APPLICATIONS

This application is based upon and claims the benefit of priority from Japanese patent application No. 2016-196673, filed on Oct. 4, 2016, the disclosure of which is incorporated herein in its entirety by reference.

BACKGROUND

The present invention relates to a voice recognition device.

Japanese Unexamined Patent Application Publication No. 2003-311028 discloses a pet robot device including a frame made of a rigid material such as metal or plastic, a soft member that covers the exterior of the frame and is made of a soft material such as cotton or cloth, and an outer skin that encases the frame and the soft member. This device further includes a voice input accepting unit that includes a microphone and accepts input of a voice input from a user, and a voice recognition unit that recognizes the voice that the voice input accepting unit has accepted.

SUMMARY

Japanese Unexamined Patent Application Publication No. 2003-311028 does not mention, however, a specific arrangement of the microphone.

If the microphone is arranged on the inner side of the soft member, a specific frequency band of the voice input from the user is absorbed by the soft member, whereby it is impossible for the voice recognition unit to accurately recognize the voice input from the user.

In order to solve the aforementioned problem, it may be possible to secure the accuracy of voice recognition by decreasing the thickness of the part of the soft member which covers the microphone or completely removing this part. In this case, however, there is another problem that a part of the outer skin becomes easily depressed.

The present invention aims to provide a technique capable of accurately recognizing the voice input from the user and to uniform likelihood of depression of the outer skin.

According to an aspect of the present invention, a voice recognition device including: an exoskeleton; a cushion member that has elasticity and covers the exoskeleton; an outer skin that covers the cushion member; a microphone fixed to the exoskeleton; and a voice recognition unit that recognizes voice obtained by the microphone, in which in a voice input area, which is on an outer side of the microphone, the cushion member is formed to be thinner than a peripheral area thereof or is formed to have zero thickness, and in a position in the vicinity of the microphone that does not overlap the microphone, an elasticity compensating member that is extended from the exoskeleton to the outer skin and is less compressed and deformed than the cushion member is arranged is provided. According to the aforementioned structure, it is possible to cause the voice recognition unit to accurately recognize the voice and to uniform the likelihood of depression of the outer skin.

A plurality of elasticity compensating members are arranged in such a way that they surround the microphone.

The microphone is fixed to an outer surface of the exoskeleton.

According to the present invention, it is possible to cause the voice recognition unit to accurately recognize the voice and to uniform the likelihood of depression of the outer skin.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

First Embodiment

In the following description, with reference to FIGS. 1 to 4, a first embodiment will be described.

Figure 1:
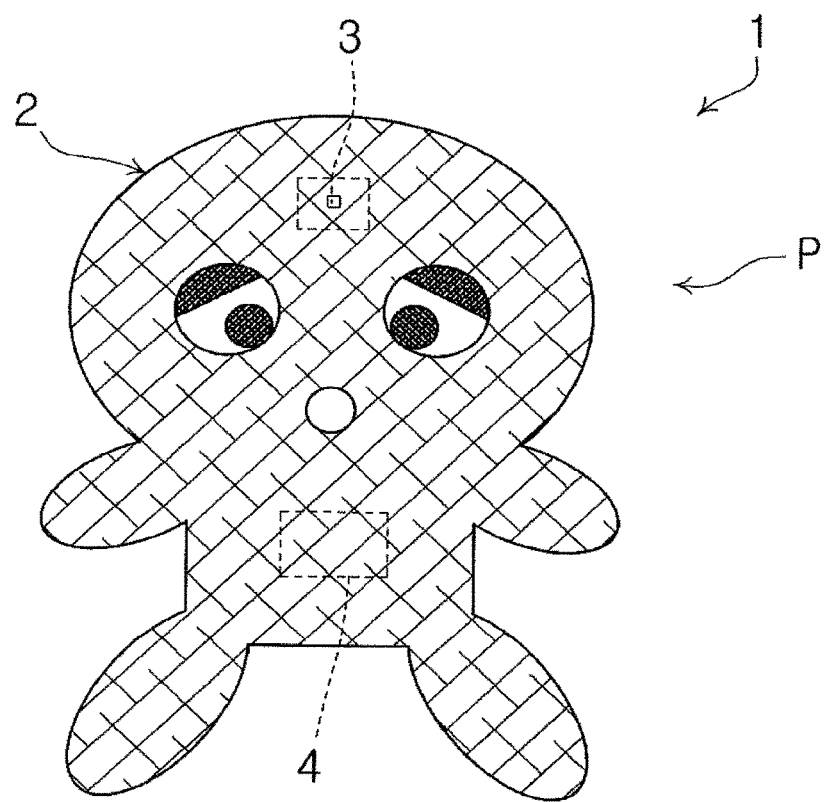
FIG. 1 is a front view of a stuffed toy type robot.

FIG. 1 shows a stuffed toy type robot 1 capable of recognizing user's voice. The stuffed toy type robot 1 includes a robot body 2, a microphone 3, and a voice recognition unit 4 that recognizes a voice obtained by the microphone 3. In this embodiment, the microphone 3 is arranged in the vicinity of the forehead of the head part of the robot body 2. Alternatively, the microphone 3 may be arranged in the vicinity of the eyes or the cheeks of the head part of the robot body 2.

Figure 2:
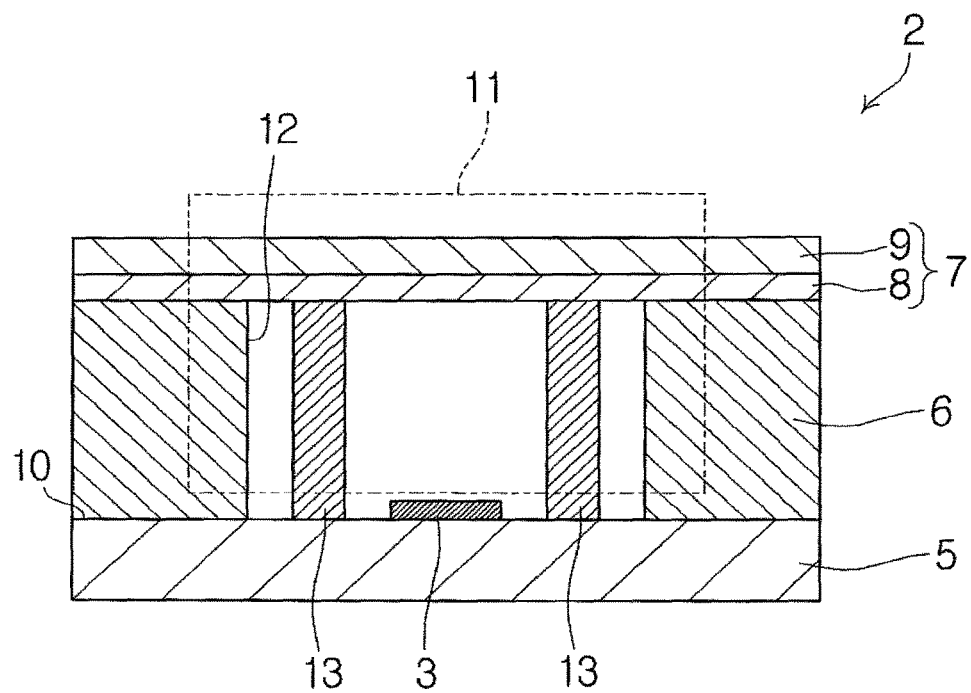
FIG. 2 is a cross-sectional view of a part in the vicinity of a microphone of a robot body.

As shown in FIG. 2, the robot body 2 includes an exoskeleton 5, a cushion member 6, and an outer skin 7.

The exoskeleton 5 is, for example, made of synthetic resin and is formed by injection molding.

The cushion member 6 has elasticity and covers the outer periphery of the exoskeleton 5. The cushion member 6 covers an outer surface 10 of the exoskeleton 5. The material of the cushion member 6 is selected in consideration of the weight and impact absorption of the stuffed toy type robot 1 and may be, for example, nitrile rubber, low-elasticity rubber, flexible polyurethane foam having an open cell structure, or cotton.

The outer skin 7 covers the outer periphery of the cushion member 6. The outer skin 7 covers an outer surface of the cushion member 6. The outer skin 7 is composed of a protection layer 8 and an outer skin body 9. The cushion member 6, the protection layer 8, and the outer skin body 9 are layered in this order and affixed to each other by known adhesive. The protection layer 8 is formed of, for example, a resin sheet having flexibility or cloth. The resin sheet may be made of, for example, polyimide or polyamidimide. The protection layer 8 may be subjected to a water-repellent treatment so that the protection layer 8 has waterproof properties or metallic fibers may be woven into the protection layer 8 so that the protection layer 8 has magnetic shielding properties. Further, the protection layer 8 is preferably made of a material that hardly absorbs and reflects the user's voice, whereby it is possible to reduce distortion of the user's voice and to improve the accuracy of voice recognition. The outer skin body 9 is, for example, fur. A stretchable material may be woven into the protection layer 8 and the outer skin body 9 so that the protection layer 8 and the outer skin body 9 become stretchable.

The microphone 3 is fixed to the outer surface 10 of the exoskeleton 5. The microphone 3 is a sound-collecting device that converts the user's voice into an electric signal and outputs the electric signal to the voice recognition unit 4. The voice recognition unit 4 recognizes the user's voice by analyzing the electric signal input from the microphone 3. In short, the voice recognition unit 4 recognizes the voice obtained by the microphone 3. The voice recognition unit 4 is composed of a well-known microcontroller.

Figure 3:
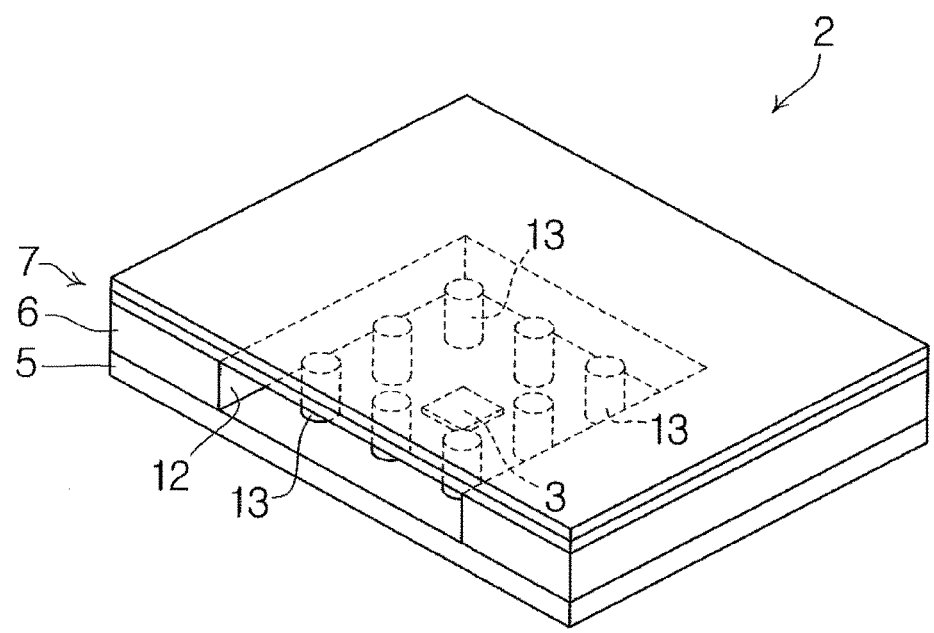
FIG. 3 is a partially cutout perspective view of a part in the vicinity of the microphone of the robot body.

In this embodiment, in a voice input area 11, which is on the outer side of the microphone 3, the thickness of the cushion member 6 is made zero. In the part immediately above the microphone 3, the thickness of the cushion member 6 is made zero. In other words, as shown in FIGS. 2 and 3, in the voice input area 11, which is on the outer side of the microphone 3, the cushion member 6 includes a cavity 12 that is extended from the exoskeleton 5 to the outer skin 7. The cushion member 6 includes the cavity 12 that is extended from the microphone 3 to the outer skin 7. As shown in FIG. 2, the voice input area 11 is an area on the outer side of the microphone 3 when it is viewed from the microphone 3. The voice input area 11 is an area which is on the outer side of the microphone 3 in the direction in which the outer skin 7 is viewed from the microphone 3. The voice input area 11 is an area which is on the side of the outer skin 7 with respect to the microphone 3 in the direction in which the outer skin 7 is viewed from the microphone 3. The voice input area 11 includes at least a spatial area between the microphone 3 and the outer skin 7. The cavity 12 accommodates the microphone 3. Accordingly, the microphone 3 is opposed to the outer skin 7.

Further, in the vicinity of the microphone 3, in a position between the exoskeleton 5 and the outer skin 7 that does not overlap the microphone 3, a plurality of spring members 13 (elasticity compensating members) that are less compressed and deformed than the cushion member 6 are arranged. In other words, in the voice input area 11, in a position between the exoskeleton 5 and the outer skin 7 that does not overlap the microphone 3, the plurality of spring members 13 that are less compressed and deformed than the cushion member 6 are arranged. Each of the spring members 13 is extended from the exoskeleton 5 to the outer skin 7. Each of the spring members 13 is accommodated in the cavity 12. As shown in FIG. 3, the plurality of spring members 13 are arranged in such a way that they surround the microphone 3 in the front-back and right-left directions. Further, FIG. 3 illustrates a structure in which eight spring members 13 surround the microphone 3 in the front-back and right-left directions. Further, each of the spring members 13 is formed into a columnar shape. Alternatively, however, the spring members 13 may be each formed into a prismatic shape. The spring members 13 are each made of a material that is less compressed and deformed than the cushion member 6, such as rigid polyurethane foam having a closed-cell structure.

The material of the cushion member 6 and that of each of the spring members 13, the number of spring members 13, and the cross-sectional area and the cross-sectional shape of each of the spring members 13 may be selected in such a way that spring characteristics and damper characteristics when the outer skin 7 is pressed down immediately above the cushion member 6 match spring characteristics and damper characteristics when the outer skin 7 is pressed down immediately above the microphone 3 as much as possible. That is, the amount that the outer skin 7 sinks when it is pressed down with a predetermined load immediately above the cushion member 6 preferably matches the amount that the outer skin 7 sinks when it is pressed down with the predetermined load immediately above the microphone 3. In a similar way, the behavior of the outer skin 7 from the time when the predetermined load applied to the outer skin 7 is removed after it is applied to the outer skin 7 immediately above the cushion member 6 to the time when the outer skin 7 is returned to the original position preferably matches the behavior of the outer skin 7 from the time when the predetermined load applied to the outer skin 7 is removed after it is applied to the outer skin 7 immediately above the microphone 3 to the time when the outer skin 7 is returned to the original position. It is therefore possible to provide the stuffed toy type robot 1 which does not make the user feel the presence of the cavity 12.

The first embodiment has been described above. The aforementioned first embodiment has the following features.

As shown in FIGS. 1 and 2, the voice recognition device P includes the exoskeleton 5, the cushion member 6 that has elasticity and covers the exoskeleton 5, the outer skin 7 that covers the cushion member 6, the microphone 3 fixed to the exoskeleton 5, and the voice recognition unit 4 that recognizes the voice obtained in the microphone 3. In the voice input area 11, which is on the outer side of the microphone 3, the cushion member 6 is formed to have zero thickness. In a position in the vicinity of the microphone 3 that does not overlap the microphone 3, the spring members 13 (elasticity compensating members) that are extended from the exoskeleton 5 to the outer skin 7 and are less compressed and deformed than the cushion member 6 are arranged. According to the aforementioned structure, the cushion member 6 is formed to have zero thickness in the voice input area 11, whereby the user's voice is hardly absorbed by the cushion member 6 and thus the voice recognition unit 4 is able to accurately recognize the voice. Further, by arranging the spring members 13 in the vicinity of the microphone 3, it is possible to uniform the likelihood of depression of the outer skin 7 in the vicinity of the microphone 3. Accordingly, the user of the stuffed toy type robot 1 hardly notices that a part of the cushion member 6 is formed to have zero thickness, whereby the stuffed toy type robot 1 that does not make the user feel strange is achieved.

Figure 4:
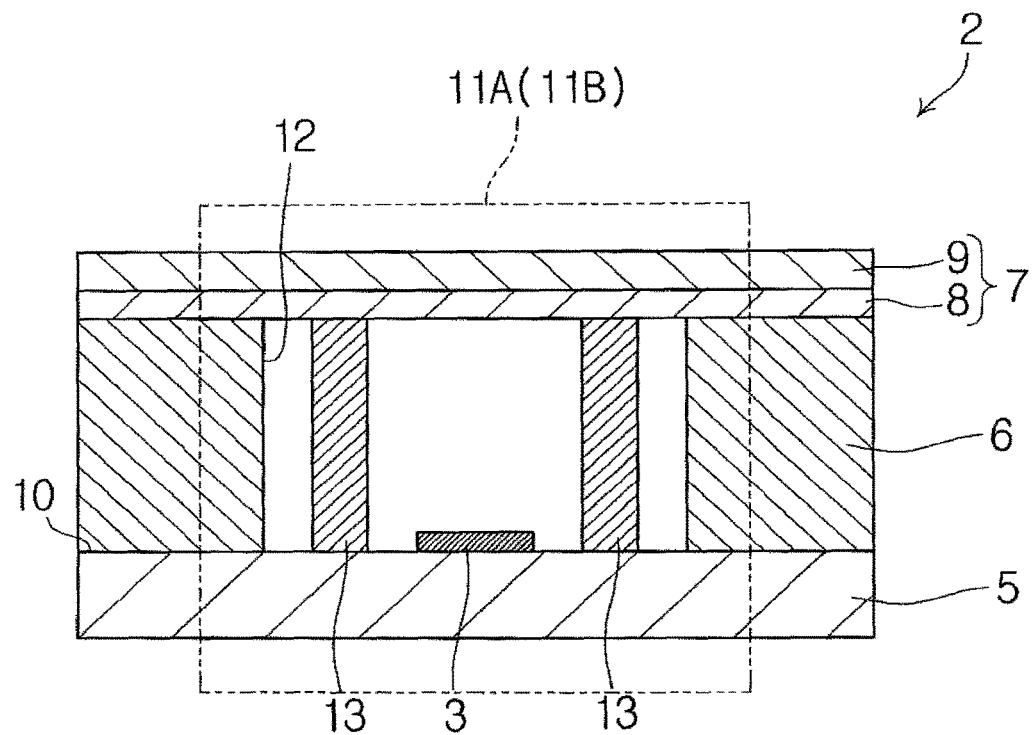
FIG. 4 is a cross-sectional view of a part in the vicinity of the microphone of the robot body.

In the aforementioned first embodiment, in the voice input area 11, which is on the outer side of the microphone 3, the cushion member 6 is formed to have zero thickness, and in a position in the vicinity of the microphone 3 that does not overlap the microphone 3, the spring members 13 that are extended from the exoskeleton 5 to the outer skin 7 and are less compressed and deformed than the cushion member 6 are arranged. In other words, as shown in FIG. 4, it can be said that, in a peripheral area 11A, which is an area in the vicinity of the microphone 3, the cushion member 6 is formed to have zero thickness, and in a position in the vicinity of the microphone 3 that does not overlap the microphone 3, the spring members 13 that are extended from the exoskeleton 5 to the outer skin 7 and are less compressed and deformed than the cushion member 6 are arranged. In a similar way, in other words, as shown in FIG. 4, it can be said that, in a corresponding area 11B, which is an area corresponding to the microphone 3, the cushion member 6 is formed to have zero thickness, and in a position in the vicinity of the microphone 3 that does not overlap the microphone 3, the spring members 13 that are extended from the exoskeleton 5 to the outer skin 7 and are less compressed and deformed than the cushion member 6 are arranged.

Second Embodiment

Figure 5:
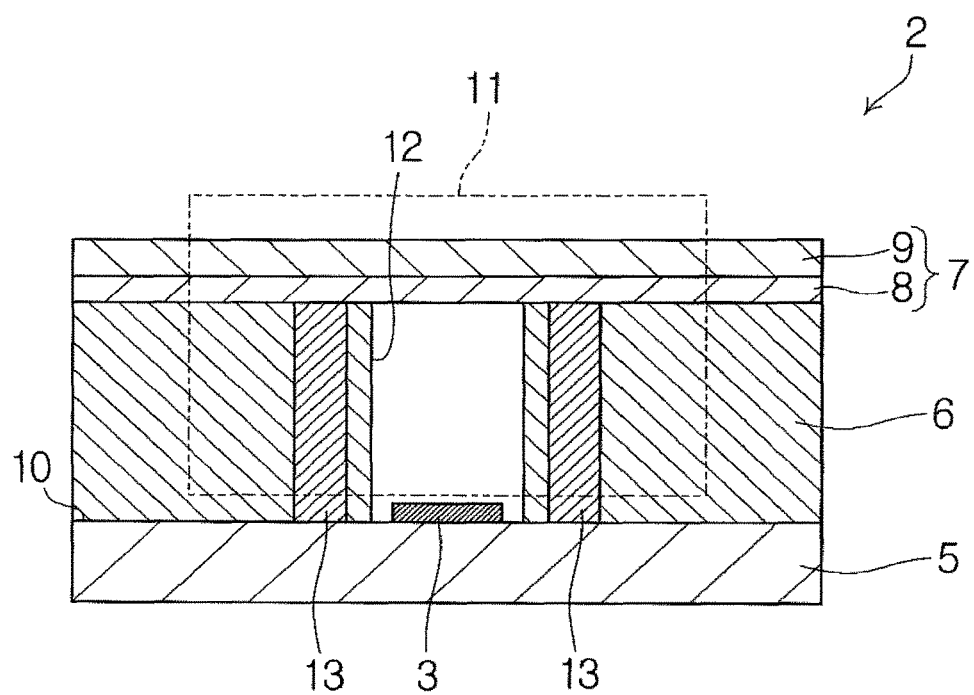
FIG. 5 is a cross-sectional view of a part in the vicinity of the microphone of the robot body.

In the following description, with reference to FIG. 5, a second embodiment will be described. In the following description, only the difference between this embodiment and the first embodiment will be mainly described and overlapping descriptions will be omitted.

In the aforementioned first embodiment, as shown for example in FIG. 2, the plurality of spring members 13 are accommodated in the cavity 12 of the cushion member 6 extending from the exoskeleton 5 to the outer skin 7. Alternatively, however, in this embodiment, the plurality of spring members 13 are not accommodated in the cavity 12 of the cushion member 6 and are buried in the cushion member 6.

According to the aforementioned structure as well, similar to that of the first embodiment, it is possible to cause the voice recognition unit 4 to accurately recognize the voice and to uniform the likelihood of depression of the outer skin 7.

Third Embodiment

Figure 6:
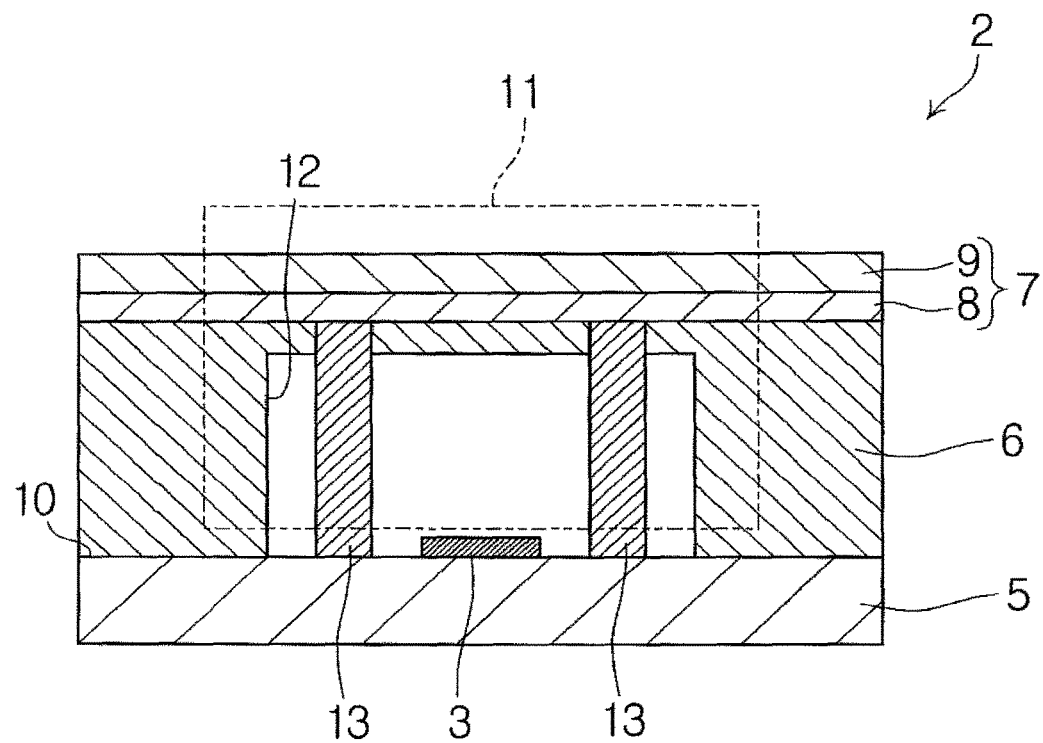
FIG. 6 is a cross-sectional view of a part in the vicinity of the microphone of the robot body.

In the following description, with reference to FIG. 6, a third embodiment will be described. In the following description, only the difference between this embodiment and the first embodiment will be mainly described and overlapping descriptions will be omitted.

In the aforementioned first embodiment, as shown for example in FIG. 2, in the voice input area 11, which is on the outer side of the microphone 3, the cushion member 6 is formed to have zero thickness. Alternatively, however, in this embodiment, in the voice input area 11, which is on the outer side of the microphone 3, the cushion member 6 is formed to be thinner than the peripheral area thereof. The thickness of the cushion member 6 means the dimension of the cushion member 6 in the direction in which the exoskeleton 5 is opposed to the outer skin 7. In this embodiment, even though the cavity 12 is extended from the exoskeleton 5 toward the outer skin 7, it does not reach the outer skin 7.

According to the aforementioned structure as well, similar to that of the first embodiment, it is possible to cause the voice recognition unit 4 to accurately recognize the voice and to uniform the likelihood of depression of the outer skin 7.

Fourth Embodiment

Figure 7:
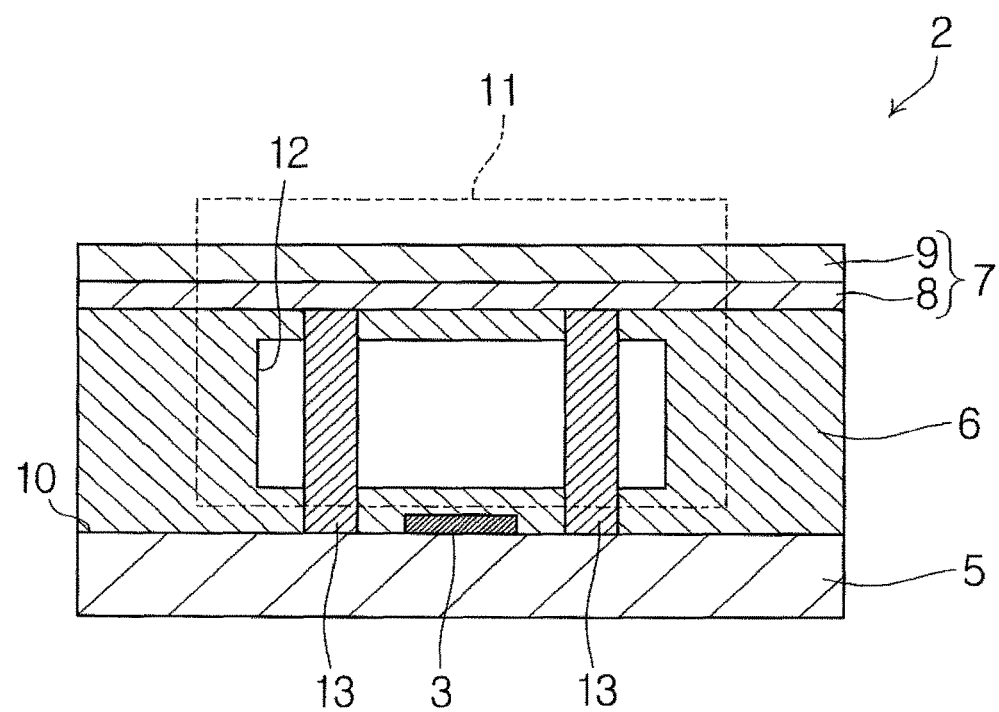
FIG. 7 is a cross-sectional view of a part in the vicinity of the microphone of the robot body.

In the following description, with reference to FIG. 7, a fourth embodiment will be described. In the following description, only the difference between this embodiment and the first embodiment will be mainly described and overlapping descriptions will be omitted.

In the aforementioned first embodiment, as shown for example in FIG. 2, in the voice input area 11, which is on the outer side of the microphone 3, the cushion member 6 is formed to have zero thickness. Alternatively, however, in this embodiment, in the voice input area 11, which is on the outer side of the microphone 3, the cushion member 6 is formed to be thinner than the peripheral area thereof. The thickness of the cushion member 6 means the dimension of the cushion member 6 in the direction in which the exoskeleton 5 is opposed to the outer skin 7. In this embodiment, even though the cavity 12 is extended from the exoskeleton 5 toward the outer skin 7, the cavity 12 is spaced apart from the exoskeleton 5 and the outer skin 7.

According to the aforementioned structure as well, similar to that of the first embodiment, it is possible to cause the voice recognition unit 4 to accurately recognize the voice and to uniform the likelihood of depression of the outer skin 7.

Fifth Embodiment

Figure 8:
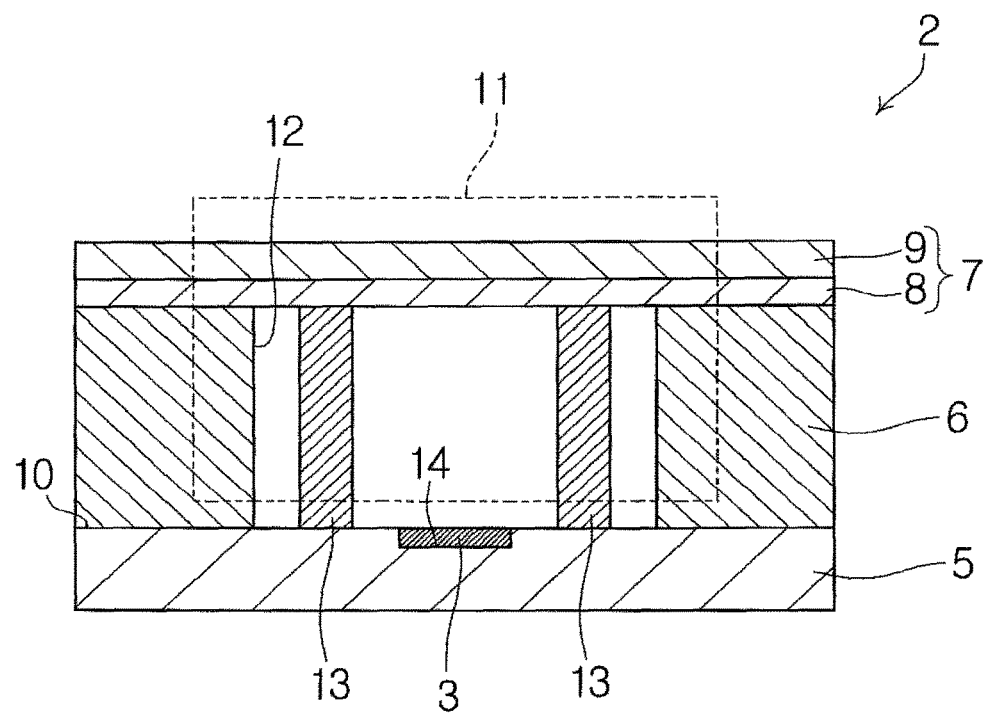
FIG. 8 is a cross-sectional view of a part in the vicinity of the microphone of the robot body.

In the following description, with reference to FIG. 8, a fifth embodiment will be described. In the following description, only the difference between this embodiment and the first embodiment will be mainly described and overlapping descriptions will be omitted.

In the aforementioned first embodiment, as shown for example in FIG. 2, the microphone 3 is fixed to the outer surface 10 of the exoskeleton 5. Alternatively, however, in this embodiment, an accommodating recess 14 is formed on the outer surface 10 of the exoskeleton 5 and the microphone 3 is accommodated in the accommodating recess 14.

According to the aforementioned structure as well, similar to that of the first embodiment, it is possible to cause the voice recognition unit 4 to accurately recognize the voice and to uniform the likelihood of depression of the outer skin 7.

Sixth Embodiment

Figure 9:
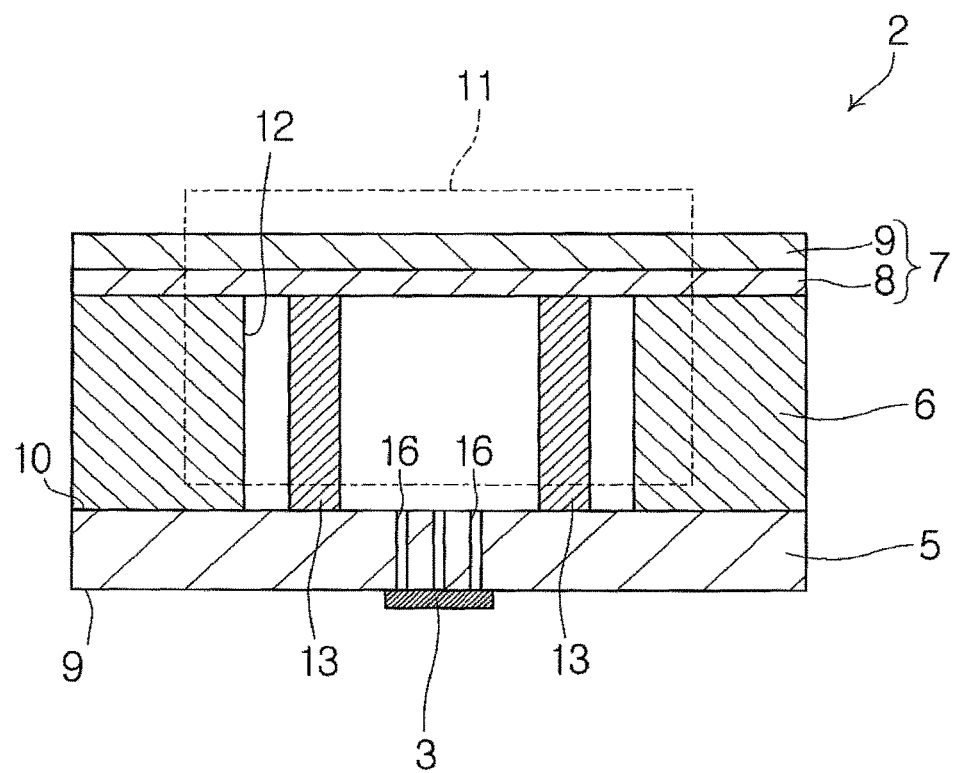
FIG. 9 is a cross-sectional view of a part in the vicinity of the microphone of the robot body.

In the following description, with reference to FIG. 9, a sixth embodiment will be described. In the following description, only the difference between this embodiment and the first embodiment will be mainly described and overlapping descriptions will be omitted.

In the aforementioned first embodiment, as shown for example in FIG. 2, the microphone 3 is fixed to the outer surface 10 of the exoskeleton 5. Alternatively, however, in this embodiment, the microphone 3 is fixed to an inner surface 15 of the exoskeleton 5. A plurality of through-holes 16 are formed in the exoskeleton 5 to cause the voice to pass there through. The microphone 3 is fixed to the inner surface 15 of the exoskeleton 5 in such a way that the microphone 3 is opposed to the plurality of through-holes 16.

According to the aforementioned structure as well, similar to that of the first embodiment, it is possible to cause the voice recognition unit 4 to accurately recognize the voice and to uniform the likelihood of depression of the outer skin 7.

The first to sixth embodiments can be combined as appropriate.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A voice recognition device comprising:
an exoskeleton;

a cushion member that has elasticity and covers the exoskeleton;

an outer skin that covers the cushion member;

a microphone fixed to the exoskeleton; and a voice recognition unit that recognizes a voice obtained by the microphone, wherein in a voice input area, which is on an outer side of the microphone, the cushion member is formed to be thinner than a peripheral area thereof or is formed to have zero thickness, and in a position in the vicinity of the microphone that does not overlap the microphone, an elasticity compensating member that is extended from the exoskeleton to the outer skin and is less compressed and deformed than the cushion member is arranged.

2. The voice recognition device according to claim 1, wherein a plurality of elasticity compensating members are arranged in such a way that the plurality of elasticity compensating members surround the microphone.

3. The voice recognition device according to claim 1, wherein the microphone is fixed to an outer surface of the exoskeleton.

* * * * *